United States Patent [19]

Schuchardt et al.

[11] 4,206,000

[45] Jun. 3, 1980

[54] METHOD AND APPARATUS FOR FILTERING MAGNETIC DEBRIS OUT OF WORK-FUNCTIONING BATHS

[75] Inventors: Donald W. Schuchardt, Glen Ellyn; Robert W. Strickland, Clarendon Hills, both of Ill.

[73] Assignee: Western Electric Company, Incorporated, New York, N.Y.

[21] Appl. No.: 962,592

[22] Filed: Nov. 21, 1978

[51] Int. Cl.$^2$ .......................... B08B 7/04; B01D 35/06

[52] U.S. Cl. .......................................... 134/10; 134/34; 210/77; 210/81; 210/222; 210/242 R

[58] Field of Search ...................... 210/222, 242 R, 77, 210/81; 134/10, 34, 42, 25 A, 1, 156, 201; 209/39, 214, 215, 232; 55/3, 500

[56] References Cited

U.S. PATENT DOCUMENTS

| | | | |
|---|---|---|---|
| 2,094,616 | 10/1937 | Parker | 209/232 |
| 2,374,535 | 4/1945 | Gibson | 134/156 UX |
| 2,436,740 | 2/1948 | Brooks | 210/222 |
| 3,136,720 | 6/1964 | Baermann | 210/222 |
| 3,206,657 | 9/1965 | Moriya | 210/222 X |
| 3,326,374 | 6/1967 | Jones | 209/232 X |
| 3,477,948 | 11/1969 | Inoue | 210/81 X |
| 3,657,119 | 4/1972 | Turbeville | 210/222 X |
| 3,712,472 | 1/1973 | Elliott | 210/222 |

*Primary Examiner*—Richard V. Fisher
*Attorney, Agent, or Firm*—K. R. Bergum

[57] ABSTRACT

A floatable magnetic filter screen (10, 40, 52, 60) for removing metallic debris from work-functioning baths (26, 26') comprises a tubular rectangular outer frame (11, 11', 14, 14', 16, 61) that supports a plurality of magnet-forming webs (18, 18', 62), in a predetermined array, within the central opening thereof. The magnets (23, 23', 64) of each web, when required, are encapsulated within a protective material covering (e.g., 19, 19') so as to physically isolate them from a given bath (26, 26') within which the filter screen (10, 40, 52, 60) is to be employed. While the filter screen is adapted to normally float on the surface of a given bath, through piece part (33, 33', 53) initiated immersion of the filter screen in the bath, preferably using a piece part-carrying basket (36, 36', 51), the bath solution is effectively forced through the filter screen during both the downward and subsequent upward displacement of the latter. As a result of such reciprocal displacement, any loose metallic debris (38) in the bath is magnetically drawn against magnet-defined sites on the filter screen, and may be readily removed periodically therefrom, such as with a simple water spray (39).

20 Claims, 7 Drawing Figures

METHOD AND APPARATUS FOR FILTERING MAGNETIC DEBRIS OUT OF WORK-FUNCTIONING BATHS

BACKGROUND OF THE INVENTION

1. Field of the Invention

This invention relates to the filtering of metallic debris out of a solution and, more particularly, to the magnetic filtering of particle debris out of work-functioning baths.

2. Description of the Prior Art

In many industrial processes, involving the use of work-functioning baths or slurries, there has often been a need to remove undesired foreign matter that tends to accumulate therein. In particular, it is often desired to remove metallic material, such as magnetically attracted ferrous debris, typically in the form of minute particles, from the desired composition of a given bath. Through such a filtering operation, a given bath may often be purged of detrimental debris to such an extent that the useful life thereof is greatly increased.

The presence of metallic particle debris, particularly if allowed to cumulatively build-up in a given bath, may often lead to a number of serious consequences. For example, such debris may often seriously impair the surface condition, or at a minimum impair the appearance, of a given article immersed in or otherwise brought into contact with the bath. In addition, depending on the nature of the bath, such debris may lead to the decomposition of, and/or in some other way effect a reduction in the strength or concentration of, one or more constitutents of the bath, such as through an oxidation process precipitated by the presence of metallic debris.

The removal of magnetic or metallic debris from a bath has become of particular importance in the wet chemistry cleaning of ceramic substrate-supported silicon integrated circuits (SIC's). More specifically, in the manufacture of such circuits it is necessary to clean the metallized surface of each ceramic substrate not only prior to the thermocompression bonding of SIC devices to the substrate, but prior to the encapsulation of the composite circuit within a protective coating.

During both of these cleaning operations, generally using a common bath consisting of a given concentration of boiling hydrogen peroxide, an appreciable amount of the magnetic particles that form the necessary magnetic ink-like coatings applied to the SIC devices, to facilitate the automated handling thereof, are dislodged. These particles, as well as other minute metallic particles in the form of undesired debris, if not in some way removed, will cumulatively build-up in the bath. The particles that are not chemically altered tend to re-deposit on the surfaces of the ceramic substrate, and the ones that adhere to the metallized circuit side of the substrate often prove to be particularly detrimental, as they can readily cause troublesome circuit shorts. Unfortunately, such shorts can occur not only immediately after a given cleaning operation, but subsequently as a result of certain particles becoming dislodged and acquiring short-circuit positions during further manufacturing operations performed on the circuits, particularly prior to and during their encapsulation within a protective coating.

With respect to those ferrous type particles that become oxidized, they normally ultimately disintegrate in the bath. Such a particle debris oxidation-disintegration process within a hydrogen peroxide bath can disadvantageously accelerate the decomposition of $H_2O_2$ therein and, thus, necessitate the rejuvenation of the bath more frequently by additions of concentrated hydrogen peroxide. In high volume integrated circuit wet chemistry cleaning operations, such frequent replacement of hydrogen peroxide, as well as periodic replacement of the entire bath when contaminated beyond the limits for effective practical use, can be costly as well as time consuming.

Heretofore, any magnetic particle debris that disadvantageously remained on the substrates, was generally removed, to the extent possibly, by a deionized water spray or rinse. Unfortunately, these procedures would not always dislodge all of the tenaciously adhering particles from the substrate and, as a result, many of such particles would remain on the metallized circuit side of the substrate causing short circuits.

Even when such particle debris did not cause short circuits, it would produce an undesirable visual surface appearance, and often present difficulties in bonding the silicon devices to the substrate.

One technique employed heretofore to remove magnetic, as distinguished from non-magnetic, material in general as it is formed within a slurry or bath is disclosed in U.S. Pat. No. 3,712,472, of E. G. Elliott. In one embodiment therein, a magnetic material transporting apparatus is partially submerged within a container-confined slurry or bath composed of both matnetic and non-magnetic material. The transporting apparatus comprises a pair of spaced, parallel manifolds of non-magnetic material, with a plurality of spaced, parallel tubes also of non-magnetic material extending between the manifolds. Each end of each tube in the one embodiment is connected to a different one of the manifolds, with a magnet functioning as a piston being slideably confined in each of the tubes. A fluidic system is coupled to both manifolds, with a selectively operable valve employed to cause fluid flow in either direction through the tubes so as to drive the magnet-functioning pistons in the direction of fluid flow.

With one of the manifolds, and a substantial portion of each tube being continuously submerged in the bath, while the other manifold and the remaining length of each tube remain outside the bath, magnetic material within the bath is attracted against each tube in the immediate area of the associated submerged magnet, and carried by magnetic attraction therealong to a non-magnetic barrier positioned outside the container. The barrier is apertured so as to allow each tube to pass in close-fit relationship therethrough. Thus, as the fluid-driven magnet in each tube moves through the barrier, the magnetic material removed from the container by the magnet is forced off of the tube and collected. In another embodiment disclosed in the same prior art reference, the piston-functioning magnets are driven along the respective tubes by rotatable shafts connected thereto.

While such prior magnetic apparatus is capable of removing at least a certain amount of metallic debris from a slurry or bath, the magnets disadvantageously are neither disposed in an array so as to extend over the major cross-sectional area of the container, nor are they adapted for simultaneous reciprocal displacement from the top to the bottom and back to the top of a given bath. Only in this way can the entire bath be visualized as subdivided into discrete cubicle zones that are at least periodically exposed to, and screened by, an array of frame-supported magnets.

The prior art apparatus in question also occupies an appreciable area of a given tank, thus minimizing the useful area, as well as depth, within which a given piece part (or parts) may be immersed within a given bath. In addition, the need to utilize an external power source to displace the singular magnets along the respective support tubes appreciably adds to the cost and complexity of the magnetic transport system.

SUMMARY OF THE INVENTION

It, therefore, is an object of the present invention to provide a magnetic filtering apparatus that is of simplified and economical construction, and that requires no auxiliary power source coupled to the magnets in order to effect their periodic displacement in such a manner as to remove magnetic debris from a given piece part work-functioning bath or slurry.

In accordance with the principles of the present invention, the above and other objects are realized in one preferred embodiment wherein the apparatus for effectively removing metallic debris, such as in the form of minute metallic particles, comprises a magnetic filter screen. The screen is formed of a tubular-like outer frame having at least a non-corrosive and non-magnetic outer surface, and a plurality of frame supported webs that extend in a predetermined spaced array across, and preferably disposed in a common plane, within the otherwise central open area defined by the frame. Each of the webs is formed of plastic tubing in several preferred embodiments, with a plurality of magnets confined therewithin and spaced therealong.

As thus constructed, the magnetic filter screen is adapted to normally float on the surface of a given work-functioning bath associated therewith. However, upon a loaded basket of articles or piece parts, or the piece parts themselves, being placed on top of the floating filter screen, the latter is forced to or near the bottom of the bath. Such reciprocal filter screen displacement effectively screens at least a substantial portion of the solution comprising the bath through the array of magnets, i.e., through the intersticies defined therebetween, during not only their downward, but subsequent upward displacement within the bath. Any loose ferrous metallic debris in the bath that has been magnetically drawn against magnetic sites on the filter screen, can be readily removed periodically therefrom, such as through the use of a simple water spray, or rinse, or air blast.

In another related embodiment, the filter screen may be subdivided, with each section hinged to an adjacent section. This allows a single piece part carrying basket, having a base of considerably smaller cross-sectional area than the composite filter screen, to overlie only one section of the latter. As thus constructed, the other one or more filter screen sections are adapted to pivot upwardly, i.e., approximately 90°, as the basket and composite filter screen are immersed into a given bath. This prevents the composite filter screen from becoming skewed, and possible slipping out from under an initially overlying piece part-loaded basket of much smaller cross-sectional area. Such a skewing problem can result, in the absence of precautionary measures being taken, which may include a restrictive dimensional correlation between a given filter screen and overlying piece part basket, because of the inherent buoyancy of the magnetic filter screen.

In accordance with another embodiment of the invention, the magnetic filter screen is releasably secured to the underside of a piece part loaded basket and, thereby, carried by the basket into and out of the one or more work-functioning baths required in a given manufacturing operation.

In accordance with still an additional embodiment of the invention, the webs of the magnetic filter screen comprise a series of ceramic-type magnets that are interconnected in a chain-like fashion by suitable non-corresive and non-magnetic strands. Depending on the nature of a given bath in which the filter screen is to be employed, the ceramic magnets may in certain situations be directly exposed to the bath (i.e., with no protective outer plastic or magnetic field-transparent metallic coating or jacket).

From the foregoing, it is seen that all of the preferred embodiments of the magnetic filter screen are of simplified and inexpensive construction, and require no external power source to physically drive the magnets in order to effect relative periodic displacement between the magnets and bath as required to remove magnetic debris from the latter.

DETAILED DESCRIPTION OF THE DRAWINGS

FIG. 1 is a perspective view of one preferred magnetic filter screen embodying the principles of the present invention;

FIG. 2 is a sectional view of a typical work-functioning tank, a bath confined therewithin, and the magnetic filter screen of FIG. 1 floating on the surface of the bath, with an illustrative basket loaded with piece parts resting on the filter screen, the latter two elements being shown in solid line form immediately before their immersion within the bath, and in phantom line form after their immersion.

FIG. 3 is an enlarged, fragmentary view of the magnetic filter screen of FIG. 1, showing in greater detail the configuration and heat-shrinkable confinement of a plurality of Alnico cylindrical magnets within the associated tubular section of the webs in accordance with one preferred embodiment, as well as the manner in which metallic debris is typically attracted to, and cumulatively collected on, the webs in the immediate vicinity of the magnets over an extended period of use, and the manner in which the debris may subsequently be periodically removed by a water spray;

Figure 1:
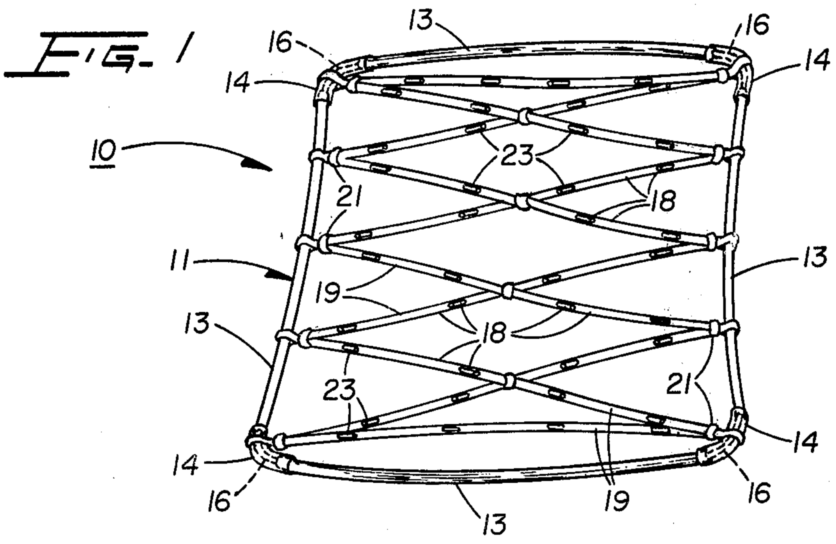
Figure 6:
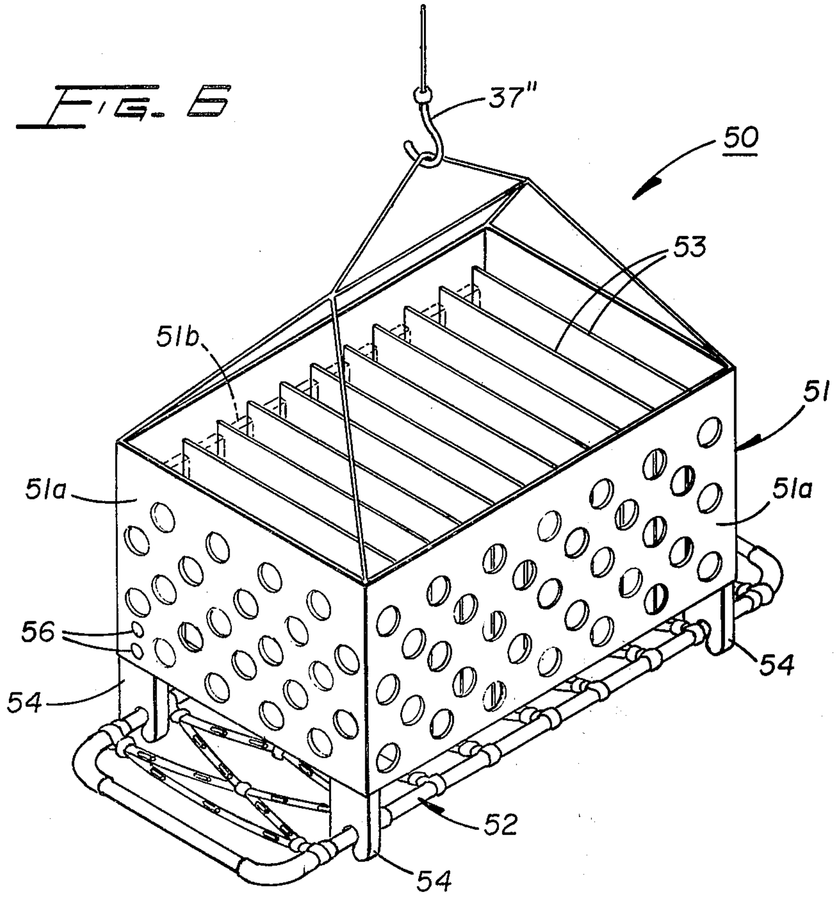
Figure 7:
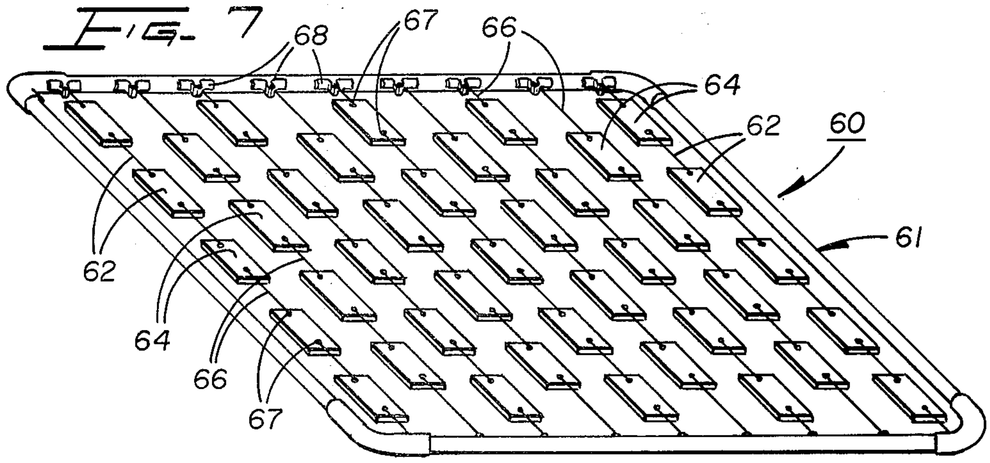

FIG. 6 is a perspective view of a typical piece part-receiving basket having a magnetic filter of the type depicted in FIG. 1, by way of illustration, spaced a short distance beneath and releasably secured to the basket in accordance with another preferred embodiment of the invention, and FIG. 7 is a perspective view of still another preferred embodiment of the invention wherein a plurality of ceramic magnets, such as of flat, rectangular configuration, are interconnected in a chain-like manner to form a desired array of webs within and secured to the outer frame of a composite filter screen in accordance with the principles of the present invention.

DETAILED DESCRIPTION OF THE INVENTION

It should be appreciated that the methods and apparatus embodied herein, and described in detail hereinbelow, have universal application in removing ferrous type metallic debris from diverse types of work-functioning baths or slurries. For purposes of illustration, however, the subject invention is described herein in connection with one particular application of primary concern, namely, in removing magnetic metallic particles, as well as certain other minute particulate debris, out of a boiling hydrogen peroxide bath employed to clean the surfaces of ceramic substrate-supported integrated circuits before both the device bonding and encapsulation operations required in their manufacture.

With particular reference first to FIG. 1, a magnetic filter screen 10 has an outer tubular frame 11 of rectangular configuration in the illustrative embodiment, with each side thereof comprising a hollow tubular member 13. The common ends of each member 13 are joined by an L-shaped or corner-defining plastic member 14. Both frame members 13 and 14 are preferably formed out of a suitable non-corresive and inert plastic material, i.e., a material that will not be attacked by boiling hydrogen peroxide. One such material is Teflon® plastic. The plastic material for the L-shaped members 14 is also preferably chosen to be of the tubular heat-shrinkable type.

Figure 3:
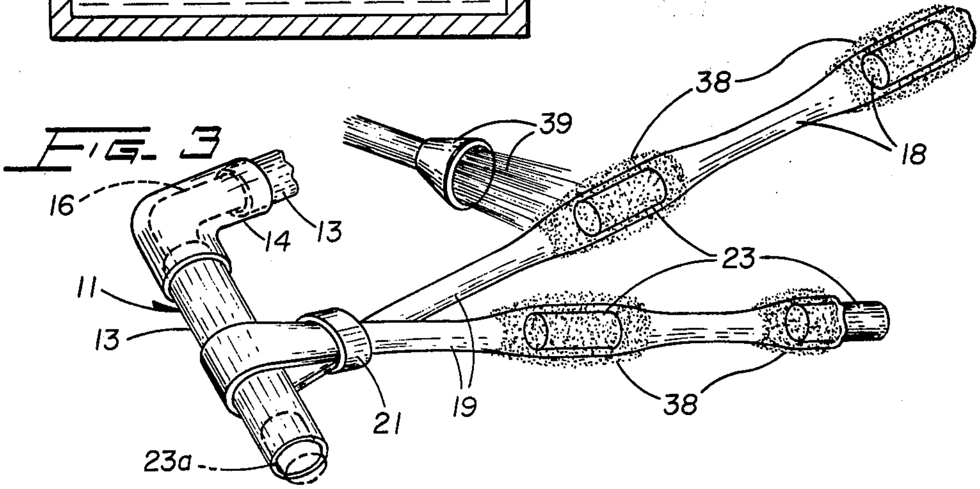

For stiffening purposes, an optional L-shaped solid rod member 16, shown in phantom in FIG. 3, may be inserted a short distance within the corner-defining ends of each adjacent pair of tubular members 13, and hermetically sealed by the tubular L-shaped members 13, if not of a metallic or plastic material that is impervious to attack by a given bath within which the filter screen is to be immersed. It should be appreciated, however, that in a boiling hydrogen peroxide bath, even stainless steel tends to be attacked when exposed thereto over prolonged periods of time.

Any one of a number of commercially available adhesives or cements, such as an epoxy adhesive sold under the tradename Chemgrip, by Chemplast, Inc., of Wayne, N.J., may be employed to facilitate the bonding of the tubular L-shaped members 14 to the tubular frame members 13. It should be further appreciated, of course, that the entire outer rectangular frame portion 11 of the composite filter screen, including the corners, may be formed out of a continuous length of relatively stiff plastic tubing, with the abutting ends suitably bonded together. A tubular frame, as distinguished from a solid rod-like frame, is generally desired to facilitate the floatation of the composite filter screen in a given bath, as desired, for reasons discussed in greater detail hereinbelow.

A plurality of webs 18 are arranged in a predetermined array within the central region defined by the outer frame 11 of the composite filter screen 10, with each web being secured at opposite ends to a different one of two mutually disposed tubular side members 13 of the frame. Each web 18 is formed, in part, of plastic tubing 19, also preferably of Teflon plastic when intended for use in a boiling hydrogen peroxide bath. The tubular webs 18 in the first preferred embodiment of FIG. 1 actually constitute segments of a continuous length of tubing, which segments span back and forth across opposite sides of the frame 11 in a criss-crossing or zig-zag manner. A small clamping ring 21 of similar plastic material is shown employed to anchor each adjacent pair of webs in the area where they cross each other so as to insure that they remain properly positioned relative to each other on the outer frame.

In accordance with the principles of the first embodiment of the invention, the webs 18 further include a plurality of short, cylindrical Alnico magnets 23, the latter being confined within each tubular section 19, and spaced apart in a linear array therealong. The particular number of magnets forming a part of each web, as well as the number of webs arranged to span the central region defined by the outer frame 11, will depend on each particular work-functioning bath application. In the first illustrative embodiment of the invention, the magnetic filter screen 10 is comprised of ten webs, with each one including four Alnico magnets 23 measuring approximately $\frac{1}{4}$ inch in diameter, and $\frac{1}{2}$ inch in axial length, serially disposed therealong.

The magnets 23 may be secured within the associated tubular section 19 of each web 18 in any desired manner, such as through force-fit insertion, the use of a heat-sensitive adhesive or cement, or by using a heat shrinkable plastic tubing for the webs, as illustrated in greater detail in FIG. 3.

It should be appreciated, of course, that the array of magnets, if desired, may also include some disposed at spaced intervals along and confined within the outer tubular frame members 13, as optionally depicted by the magnet 23*a* shown in phantom in FIG. 3. It has been found much more convenient, however, to confine the magnets within the tubular sections 19 of the webs 18, and this arrangement necessarily increases the buoyancy of the outer frame members 13. Should the weight of a given number of magnets desired for a particular application be too large for a given filter screen to float, it should be further appreciated that any number of auxiliary floats, made out of suitable non-corresive material, may be secured to the filter screen to establish the desired degree of buoyancy therefor.

In certain applications, it may be desirable to use magnets composed of material other than ferrous iron, of which Alnico magnets are composed. By way of alternatives, the magnets may be of the ceramic type, in which case they may or may not need to be plastic-jacketed, or otherwise protected with a special material of either a non-conductive or metallic magnetic field-transparent type. The use of ceramic magnets will be discussed in greater detail hereinafter in connection with another preferred embodiment. Concomitantly, it should be appreciated that electromagnets could also be employed, but have the disadvantage of necessitating direct wiring to, and the use of, an outside auxiliary power source.

Figure 2:
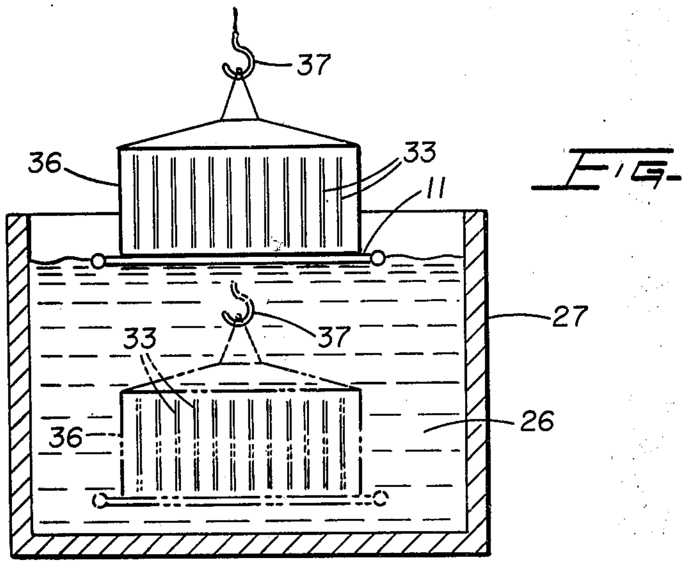

In a typical integrated circuit wet chemistry cleaning operation, as illustrated in FIG. 2, the magnetic filter screen 10 of FIG. 1 is positioned on top of a bath 26, typically consisting of a 15 percent concentration of boiling hydrogen peroxide, confined with a suitable metal tank 27, preferably having a Teflon plastic or glass liner therein. Normally associated with such a tank is an overlying exhaust system, not shown.

In practice it is generally desirable that the magnetic filter screen 10 be dimensioned to be slightly smaller than the inside cross-sectional area of the particular tank or container within which it is to be confined. As such, whenever the filter screen is at least substantially completely submerged periodically to or near the bottom of the bath, it will effectively force essentially all of the solution comprising the bath therethrough.

As previously mentioned, the metallized integrated circuitry, including the associated SIC devices, to be cleaned with boiling hydrogen peroxide are normally supported on ceramic substrates 33, shown only symbolically in FIG. 2. A plurality of such integrated circuits, generally referred to as hybrid integrated circuits, are vertically mounted within respective nesting areas of a basket 36 made, for example, of stainless steel. Such a basket is typically formed with a base and sidewalls that have a plurality of openings so as to allow the solution of the bath to freely flow therethrough. To this end, the baskets may be made of metal or plastic rod-like structural elements, wire-like mesh, or of perforated plates, as depicted in FIG. 6, which relates to another preferred embodiment of the invention discussed in greater detail herebelow. The baskets 36 typically have a suitable hook 37, or similar functioning member, preferably adapted to facilitate their releasable coupling to an overhead conveyor system (not shown).

With the base of the basket 36 (or of two or more baskets) preferably being dimensioned to coincide with the cross-sectional area of the magnetic filter screen 10, or vice versa, there is essentially no possibility of the filter screen becoming skewed relative to, or even completely displaced out from under, the basket(s) as the latter forces the filter screen to or near the bottom of the bath, as depicted in phantom in FIG. 2.

The piece part loaded basket 36 typically is allowed to become fully submerged within the bath, together with the filter screen on which it is resting, by gravity displacement. Such displacement advantageously results in the boiling hydrogen peroxide solution, as previously mentioned, being effectively screened through the array of web-confined magnets 23, i.e., through the intersticies defined therebetween, during both the downward and subsequent upward displacement within the bath.

During such reciprocal filter screen movement, while remaining substantially horizontal, any loose metallic ink-like particles, as well as any other contaminating or undesired metal debris of minute size, generally identified by the numeral 38 in FIG. 3, are magnetically drawn against the tubular webs 18 of the filter screen 10 in those magnetic regions, or sites, therealong immediately adjacent the web-confined magnets 23.

The accumulated metallic debris collected on the magnetic filter screen 10 may be readily removed therefrom periodically by means of a water spray 39, illustrated in FIG. 3, or by a water rinse, or a suitably directed air blast, or any combination of the three described operations, as well as by wiping the tubing with a suitable cloth. It is understood, of course, that a particular formulated chemical cleaning solution may be employed in place of water to remove the debris from the filter screen if desired in any given application.

Figure 4:
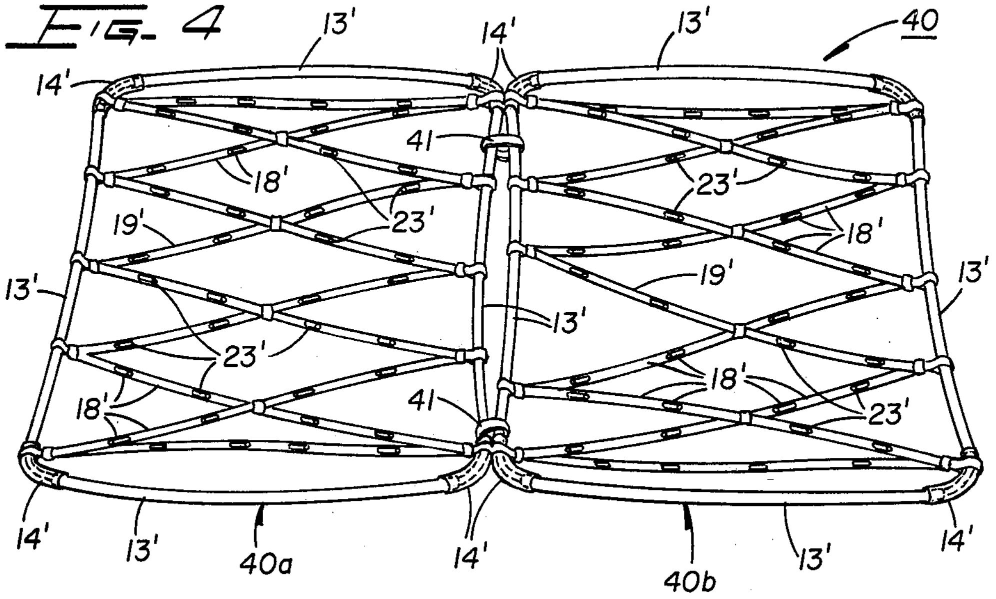
FIG. 4 is a perspective view of a second preferred embodiment of the invention wherein the magnetic filter of FIG. 1 is formed of two sections, hinged together.

In accordance with a second preferred embodiment of the invention, a multi-sectioned magnetic filter screen 40 is depicted in FIG. 4, with each section basically comprising a filter that is constructed essentially identically to the filter screen 10 of FIG. 1. As such, structural elements in FIG. 4 that correspond respectively to those in FIG. 1 are identified by like, but primed, reference numerals. The two sections 40*a*, 40*b* of the composite filter screen 40 are loosely hinged together along two adjacent borders by any suitable means, such as by a pair of spaced Teflon plastic rings. 41.

The multi-sectioned filter screen 40 may be of particular advantage when the number, and/or size, of the piece part-loaded baskets to be immersed in a given bath may vary from time to time. In such situations, the base dimensions of a single basket, for example, may not always be as large as the cross-sectional dimensions of the normally floating composite filter screen therebelow. When this is the case, a single magnetic filter screen could easily become skewed, because of its inherent buoyancy, and slip out from under the smaller piece part-loaded basket, even if the latter were initially substantially centered on the filter screen. The multi-sectioned filter screen 40 is thus seen to have more universal application in diverse types of work-function bath operations performed on various types of piece parts.

Figure 5:
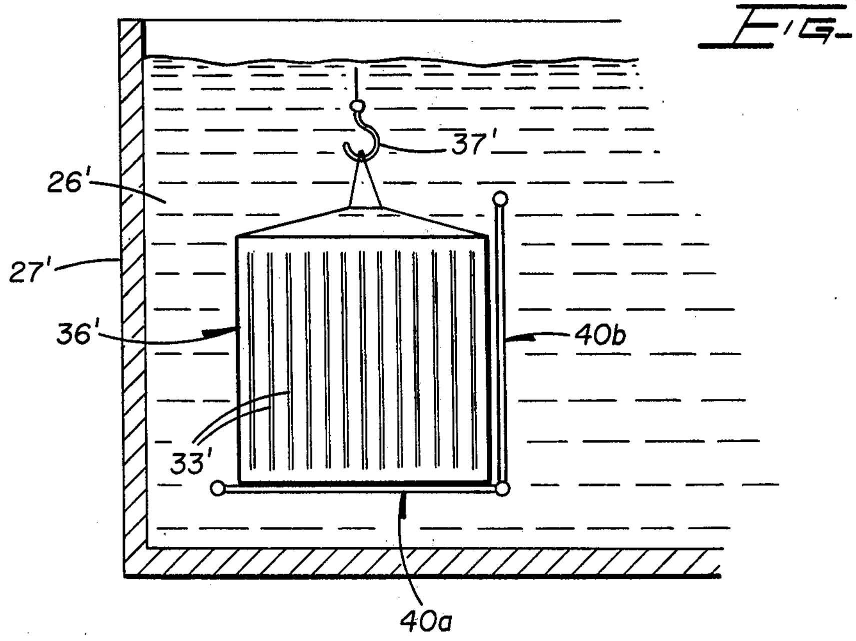
FIG. 5 is a fragmentary sectional view, showing a piece part-loaded basket positioned on top of only one section of the two-part magnetic filter screen of FIG. 4, while immersed in a tank-confined bath, with the other hinged section of the filter screen being vertically oriented as a result of also being immersed in the bath.

FIG. 5 is a fragmentary sectional view of the composite magnetic filter screen 40, illustrating a piece part-loaded basket 36', having a base that corresponds with the cross-sectional area of only one section of the filter screen, resting on section 40*a*, while both sections are submerged in a bath 26' confined within a container 27'. All other identified elements depicted in FIG. 5 respectively correspond to those depicted in FIG. 2, and are identified by like, but primed reference numerals. The filter screen section 40*b*, without any portion of the single basket resting thereon, or having a separate basket positioned thereon, simply pivots approximately 90° (i.e., to an approximately vertical orientation) during the basket-forced submersion of the composite filter screen within the bath. Constructed in this manner, it is readily seen that notwithstanding the inherent buoyancy of the composite filter screen 40, the basket coinciding with section 40*a* thereof cannot readily become skewed to such an extent that it could completely slip out from under the horizontal base of the basket.

It is readily appreciated, of course, that three, or more, filter screen sections may be employed to form a composite, multi-sectioned filter screen. For example, the filter screen could readily be constructed with three sections, with each section dimensioned to coincide with the cross-sectional area of the base of only one basket. In that case, and if only one basket were to be used sometimes with such a filter screen in a given work-functioning bath, the single basket would normally be positioned on the center filter screen section so as to allow both outer sections to pivot to a vertical position while submerged. Should a given basket have a base considerably larger than one filter screen section, but smaller than two sections, it would be placed as near to the center of such a composite filter screen as possible.

FIG. 6 illustrates a composite apparatus 50 comprising a piece part carrying basket 51 and a one section magnetic filter screen 52 that for purposes of illustration is essentially identical to the filter screen 10 of FIG. 1. The basket 51, as illustrated, has an apertured base plate (not shown) and apertured sidewalls 51*a*, and optional channel members 51*b* to receive, for example, a plurality of planar configured piece parts, such as ceramic substrate-supported integrated circuits 53. As previously pointed out, the basket 51, as the basket 27, could also readily be constructed out of plastic or metal rod-like members, or wire-like mesh, if desired. All other identified elements depicted in FIG. 6 respectively correspond to those depicted in FIG. 2, and are identified by like, but double primed reference numerals.

The filter screen 52 is releasably secured to the base of the basket 51, and preferably spaced a predetermined distance therefrom, by means of a plurality of suitable support brackets 54. The brackets, as is the case with the basket and filter screen may be made of either a suitable metal that is at least substantially inert with respect to the particular bath within which they are to be immersed, such as stainless steel when employed in a hydrogen peroxide cleaning bath, or a suitable plastic, such as Teflon plastic for the same type of bath.

The brackets 54 may be secured to the basket 51 in any one of a number of conventional ways, such as through the use of members 56. The filter screen 52 may likewise be secured to the brackets in many different ways, one preferable way is through the use of notched clamping ends that preferably are formed to be resilient so as to effect a releasable snap-on, force-fit type of clamping engagement therewith. Threaded members (not shown) may be similarly employed to clamp the notched (or any other type of configured) ends of the brackets to the associated filter screen.

It is apparent, of course, that when a magnetic filter screen 52 of the type embodied in FIG. 6 is secured to the piece part carrying basket 51, that a number of such filter screens would normally have to be provided, the particular number depending on how many baskets are required, and the rate at which they are successively immersed in a given bath (or baths) for a particular application. It is further appreciated that the rate at which the filter screens are reciprocally displaced within a given bath directly determines the amount of metallic debris that may be cumulatively removed therefrom. Thus, when using a basket-filter screen combination as depicted in FIG. 6, it would normally be desirous to have a filter screen associated with each basket that is to be successively immersed in a given bath.

It should be further understood that when it is desired to secure the magnetic filter screens to at least certain ones of a series of piece part carrying baskets employed in a given operation, the cleaning of the filter screens may be somewhat more cumbersome that when a single filter screen is adapted to simply normally float on the surface of a given bath with which it is associated.

FIG. 7 illustrates an additional embodiment of the invention wherein a magnetic filter screen 60 is comprised of an outer tubular-like frame 61, which may be essentially identical to the frame 11 of the filter screen 10 of FIG. 1. The filter screen 60 is distinguished from the preceding embodiments, however, by the utilization of a plurality of criss-crossing webs 62 comprised, in part, of a series of flat, rectangularly shaped ceramic magnets 64.

The magnets of each web are interconnected through the use of any suitable strand(s) or wire(s) 66 made out of material that is non-corresive and inert with respect to the composition of the particular bath with which the filter screen is to be associated. As illustrated, each magnet 64 has two holes 67 extending therethrough, with each hole being adjacent one of two mutually disposed edges of the magnet. A continuous strand, such as of Teflon plastic, is preferably threaded through the respective holes in each one of the series of ceramic magnets, in succession, to form each composite web. Such a continuous strand may be secured to the outer frame 61 at the end of each defined web in any one of a number of ways, such as by the use of suitable eyelets or anchors 68 bonded or otherwise secured to the tubular members forming the outer frame. In this manner, the magnets of a given array may not only be mounted in an essentially common plane, but in parallel rows, if desired. The magnet supporting strand (or strands) 66 of each web could, of course, also simply be wrapped around the tubular frame members, and held in proper spaced relationship by small circular rings (not shown), as in the other illustrative embodiments.

The advantage of utilizing ceramic magnets in some chemically active work-functioning baths is that they often do not have to be covered or coated with a special non-corresive and inert material in order to function without any deleterious effects. Ceramic magnets, however, are temperature sensitive and, thus, if immersed in a boiling hydrogen peroxide bath would at least temporarily lose most of their magnetism until removed from the bath. As such, ceramic magnets are generally not preferred for wet chemistry cleaning of substrate-supported hybrid intergrated circuits in the manner of concern herein.

It is appreciated, of course, that if ceramic type magnets are capable of withstanding the temperature employed in any given bath, they may then be applicable, even in active chemical baths that would normally attack the ceramic surfaces thereof, by simply coating or encapsulating the magnets with an inert, non-magnetic outer coating or jacket, which may either comprise a plastic material, or a magnetic field-transparent metallic material.

In summary, a uniquely constructed magnetic filter screen has been described, and is claimed hereinbelow, that utilizes an array of frame-supported magnets in such a way that metallic debris, such as in the form of minute particles, are magnetically drawn against magnetic sites of the filter screen each time the latter, which is adapted to normally float on the surface of a given work-functioning bath, is reciprocally displaced downwardly and subsequently upwardly within the bath in response to the immersion and subsequent withdrawal of one, or more, piece parts, as a result of having a work-function performed thereon while in the bath.

While several related and preferred magnetic filter screens have been disclosed herein, it is obvious that various modifications may be made to the present illustrative embodiments of the invention, and that a number of alternative related embodiments, as well as uses therefor, may be devised, without departing from the spirit and scope of the invention.

What is claimed is:

1. A magnetic filter screen comprising:

a tubular frame of four sided configuration, adapted to float, with at least the major portion of each side thereof being formed of a section of plastic tubing, and wherein opposite end regions of each of four short L-shaped members are respectively secured to the adjacent tubular end portions of an associated pair of said tubular frame sections that together at least in part define a corner of said frame;

a plurality of magnetic means arranged in a predetermined array for confinement within the central opening defined by said frame, and elongated support means for interconnecting said magnetic means, and for securing said array thereof to said frame.

2. A magnetic filter screen in accordance with claim 1, wherein said magnetic means comprise permanent magnets, and wherein said elongated support means comprises plastic tubing, with groups of said magnets forming said array thereof being serially confined in and fixedly spaced along said tubing to form a plurality of webs, each web extending between and supported at opposite ends by two mutually disposed tubular sides of said frame.

3. A magnetic filter screen in accordance with claim 1 wherein said L-shaped members are formed of heat shrinkable plastic tubing, with the end regions of each one thereof being respectively positioned coaxially on an end portion of a different one of the associated pair of tubular frame sections to define a corner of said frame.

4. A magnetic filter in accordance with claim 3 wherein four L-shaped rod-like members are dimensioned so that the end regions of each one thereof are respectively inserted into an end portion of a different one of the associated pair of tubular frame sections, with each L-shaped rod-like member being hermetically sealed by a different one of said L-shaped tubular members positioned coaxially thereon, so as to form a composite frame corner.

5. A magnetic filter screen in accordance with claim 1 wherein a plurality of magnetic means are also spaced apart and confined within at least selected portions of the four side sections of said tubular frame.

6. A magnetic filter screen comprising:

a tubular frame of four sided configuration, adapted to float, with at least the major portion of each side thereof being formed of a section of plastic tubing;

a plurality of cylindrical Alnico permanent magnets arranged in a predetermined array for confinement within the central opening defined by said frame;

elongated support means for interconnecting said magnets, and for securing said array thereof to said frame, said elongated support means comprising plastic tubing, with groups of said magnets forming said array thereof being serially confined in and fixedly spaced along said tubing to form a plurality of webs, each web extending between and supported at opposite ends by two mutually disposed tubular sides of said frame, with said plurality of webs being continuous, and arranged in a zig-zag pattern extending across the central opening of said frame, and a plurality of non-magnetic ring-shaped members respectively coupling the adjacent pairs of webs together in the respective regions where they cross each other.

7. A magnetic filter screen in accordance with claim 6 wherein opposite end regions of each of four short L-shaped members are respectively secured to the adjacent tubular end portions of an associated pair of frame members that together at least in part define a corner of said frame.

8. A magnetic filter screen in accordance with claim 7 wherein said L-shaped members are formed of heat shrinkable plastic tubing, with the end regions of each one thereof being respectively positioned coaxially on an end portion of a different one of the associated pair of tubular frame members to define a corner of said frame.

9. A magnetic filter screen in accordance with claim 8 wherein four L-shaped rod-like members are dimensioned so that the end regions of each one thereof are respectively inserted into an end portion of a different one of the associated pair of tubular frame members, with each L-shaped rod-like member being hermetically sealed by a different one of said L-shaped tubular members positioned coaxially thereon, so as to form a composite frame corner.

10. A magnetic filter screen comprising:

a tubular frame having at least a non-magnetic outer surface, and adapted to float, said frame being of four sided configuration, with at least the major portion of the straight sides thereof formed of plastic tubing;

a plurality of ceramic permanent magnets, with each magnet being apertured, and elongated support means for interconnecting said magnetic means, and for securing said array thereof to said frame, said elongated support means comprising non-magnetic strand means, with said strand means being threaded serially through the apertures of said magnets, and said magnets further being subdivided and serially disposed by said strand means into a plurality of webs, with each web, through said strand means, being suspended between and supported at opposite ends by two mutually disposed sides of said frame.

11. A magnetic filter screen in accordance with claim 10 wherein said strand means comprises one continuous strand of non-magnetic material, and wherein each ceramic magnet is of flat, rectangular shape, having a strand-receiving aperture formed therethrough adjacent each of two mutually disposed edges thereof.

12. A magnetic filter in accordance with claim 11 wherein said ceramic magnets are encapsulated in a protective covering that is impervious with respect to a given bath in which the filter screen is to be immersed.

13. An apparatus for holding a plurality of piece parts while immersed in a work-functioning bath, and for simultaneously removing metallic debris from said bath, comprising:

a piece part carrying basket having a base and sidewalls formed with a substantial number of openings therethrough so as to allow the solution of a bath to freely flow through the basket while immersed, said basket further including a plurality of brackets secured thereto, and extending a short distance downwardly from the base thereof, with the terminating ends of said brackets being adapted to hold a different section of a tubular frame, and a magnetic filter screen having a tubular frame formed with at least a non-magnetic outer surface, and adapted to float, with said frame being received by and secured to said brackets so as to be positioned in close proximity to the base of said basket, said filter screen further including a plurality of magnetic means, arranged in a predetermined array within the central opening defined by said frame, and elongated support means for interconnecting said array of magnetic means, and for securing said array thereof to said frame.

14. An apparatus in accordance with claim 13 wherein said basket is made of stainless steel, wherein said brackets are adapted to releasably clamp said tubular frame thereto, and wherein said frame is of four-sided configuration, with at least the major portion of the straight sides thereof formed of plastic tubing.

15. An apparatus in accordance with claim 14 wherein said magnetic means comprise permanent magnets of the cylindrical Alnico type, and wherein said elongated support means comprises plastic tubing, with groups of said magnets forming said array thereof being serially confined in and fixedly spaced along said tubing to form a plurality of webs, each web extending between and supported at opposite ends by two mutually disposed tubular sides of said frame.

16. An apparatus in accordance with claim 14 wherein said magnets are of the ceramic type, and apertured, and wherein said elongated support means comprises non-magnetic strand means, with said strand means being threaded serially through the apertures of said magnets, and with said magnets being subdivided and serially disposed to form a plurality of webs, with each web being suspended between and connected to two mutually disposed sides of said frame by said strand means.

17. A method of filtering metallic debris out of a bath in which a work function is performed on an article, said method comprising the steps of:

floating a frame-supported array of magnets, adapted to be impervious to the bath, on the surface thereof;

positioning the article, which is to have a work-function performed thereon while at least partially submersed in said bath, at least on said frame for said array of magnets while the latter are initially floating on the surface of the bath, and thereafter submerging at least a portion of the article, which also forces the submersion of said frame-supported array of magnets, within said bath, said submersion causing the solution comprising said bath to be effectively screened through the intersticies defined between said spaced array of magnets during both their downward and subsequent upward displacement within the bath, said reciprocal displacement resulting in any loose metallic debris within said bath being magnetically drawn toward and cumulatively collected as deposits at magnetic sites respectively associated with said magnets, said debris thus being removed in loose form from said bath.

18. A method in accordance with claim 17 wherein said collected deposits of debris are removed from said magnetic sites upon said magnets being periodically withdrawn from the bath, with a force-imparted medium thereafter being directed against the accumulated deposits of debris so as to overcome the established magnetic attractive forces exerted thereagainst by said magnets.

19. A method in accordance with claim 18 wherein said magnetic sites comprise the respective surfaces of said magnets, with said metallic debris thus being magnetically attracted directly against and periodically removed from said magnets by said force-imparted medium, which comprises a water spray.

20. A method in accordance with claim 18 wherein said array of magnets are subdivided and serially disposed into discrete groups as supported by the frame, with each group of magnets being confined within and fixedly spaced along different frame sections of non-magnetic tubing of a type that is impervious to the bath within which it is exposed, and wherein said debris within the bath is cumulatively magnetically attracted against said sections of tubing at magnetic sites therealong in the immediate regions of said magnets respectively confined therewithin, and wherein the resulting accumulated deposits of metallic debris are periodically removed from said sections of tubing by said force-imparted medium, which comprises a water spray.

* * * * *